United States Patent [19]

Fortunato et al.

[11] 4,320,973
[45] Mar. 23, 1982

[54] DEVICE FOR INTERFERENTIAL SPECTROMETRY WITH SELECTIVE MODULATION

[75] Inventors: Gérard Fortunato, Cachan; Robert A. Maréchal, Orsay; Marc G. Y. Ménétrier, St. Ouen, all of France

[73] Assignee: Agence Nationale de Valorisation de la Recherche (ANVAR), Neuilly sur Seine, France

[21] Appl. No.: 102,335

[22] Filed: Dec. 11, 1979

Related U.S. Application Data

[63] Continuation of Ser. No. 853,551, Nov. 21, 1977, abandoned, which is a continuation of Ser. No. 656,424, Feb. 9, 1976, abandoned.

[30] Foreign Application Priority Data

Feb. 11, 1975 [FR] France ............................... 75 04264

[51] Int. Cl.³ .............................................. G01B 9/02
[52] U.S. Cl. .................................... 356/346; 356/351
[58] Field of Search ................. 356/346, 351; 350/12, 350/13, 14, 15

[56] References Cited

U.S. PATENT DOCUMENTS

| | | | |
|---|---|---|---|
| 3,146,294 | 8/1964 | Koester | 350/15 |
| 3,868,168 | 2/1975 | De Veer | 350/12 |
| 3,924,952 | 12/1975 | Marechal | 356/346 |

OTHER PUBLICATIONS

Francon, M., and S. Mallick, *Polarization Interferometers;* Wiley-Interscience, 1971, pp. 30-33.

*Primary Examiner*—John K. Corbin
*Assistant Examiner*—Bruce Y. Arnold
*Attorney, Agent, or Firm*—Diller, Ramik & Wight

[57] ABSTRACT

A highly luminous device for interferential spectrometry, comprises a birefringent beam-splitting interferometer combined with an optical system supplying localized fringes. As the beam-splitter element, it has at least one birefringent prism mounted along the optical axis of the device and producing an angular splitting, such as a Wollaston prism, of materials suitable for the construction of such prisms and selected as a function of birefringence and transparent over a wide range of wave lengths. The beam-splitter is placed between a polarizer and an analyzer of variable orientation to obtain flux modulation.

4 Claims, 5 Drawing Figures

DEVICE FOR INTERFERENTIAL SPECTROMETRY WITH SELECTIVE MODULATION

This is a continuation of application Ser. No. 853,551 of Nov. 21, 1977, which is a continuation of Ser. No. 656,424 filed Feb. 9, 1976, each now abandoned.

BACKGROUND OF THE INVENTION

1. Field of the Invention

The present invention relates to a device for interferential spectrometry with selective modulation. More particularly the invention relates to improvements in the device described in U.S. Pat. No. 3,924,952.

The aforesaid patent relates to a highly luminous device for interferential spectrometry, which includes an interferometer with beam-splitting by translation combined with objective lens means providing fringes in its focal plane. This device permits also the correlation or the derivation of spectra or, again, the correlation of derivatives.

2. Description of the Prior Art

A device according to the aforesaid patent is characterised in that the beam-splitter is a Sagnac interferometer in which a mirror is displacable in translation.

In such a device, the analysis of the fringes is effected by placing a periodic grating of lines parallel to the fringes and of pitch p, in their plane. This grating can vibrate periodically at the frequency f, perpendicularly to the direction of the fringes. When the pitch p is equal to the interfringe $i=(\lambda F/T)$, the luminous flux emerging from the grating is modulated at the frequency f and this only for the wavelength $\lambda$, such that $(\lambda F/T)=p$. Spectral analysis of a source, or the variation of the absorption of a body as a function of a wavelength is obtained by successively bringing the interfringe corresponding to the different wavelengths contained in the source to be equal to the pitch p of the grating, which can be produced by causing notably the beam-splitting T (transversal translation) of the interferometer to vary, or the focal line F of the objective lens to vary by using a zoom.

The variations in illumination in the focal plane of this device represent the Fourier transform of the spectral distribution of the source. New, it is known that to make a correlation of two spectra it is sufficient to form the product of their Fourier transforms, which product is obtained simply in the device of the aforementioned patent by replacing the periodic grating of pitch p by a grating representing the Fourier transform of the spectrum of the substance studied or sought. U.S. Pat. No. 3,924,952 also describes increasing the sensitivity of the method of detection by correlation by effecting, not the correlation of the spectra, but the correlation of the derivatives of the spectra, thus providing a more positive technique, particularly when the spectrum characteristic of the substance is a spectrum of emission or of absorption bands. To pass very easily from the correlation of the spectra to the correlation of derivatives of spectra, it suffices to place in the plane of the grating a parabolic transmission mask.

The device of U.S. Pat. No. 3,924,952 uses preferably a Sagnac interferometer as a beam-splitter interferometer, which at present enables variable resolutions to be obtained in the visible range reaching up to about 5,000.

Applicants have found that numerous applications, especially industrial, to analysis (fluorescence of compounds, absorption, atomic absorption) only require low resolutions of the order of some hundreds; and that the high cost and relative complexity of the spectrometric arrangements of the aforementioned patent do not justify their employment in industrial operations for which such a low resolution largely suffices.

OBJECTS AND SUMMARY OF THE INVENTION

Accordingly, it is an object of the present invention to provide devices according to U.S. Pat. No. 3,924,952, which are specially suitable for these low resolutions.

In the latter device, the resolution $R=(\lambda/\Delta\lambda)$ (resolved spectral interval) is equal to $R=(2\alpha T/\lambda)$.

The improvements according to the present invention rest on the observation that, by keeping a large value for the angle of the interference field $\alpha$, that is to say by ensuring the luminosity indispensable for such equipment, it is possible, to work at these low resolutions to decrease the beam-splitting T. Now, when low beam-splitting is required, it is possible to use simpler and more compact interferometers than the Sagnac, such as, in particular, polarisation interferometers.

In seeking to use a transparent interferometer in the ultraviolet and the near infrared, quartz components were first used with a uniaxial birefringent crystal $\Delta n = 10^{-2}$, but the low birefringence of quartz does not permit a Savart polarisation interferometer to be used for the desired object: a Savart of 30 cms thickness would, in fact, be needed to obtain a resolution of 500.

In his researches, Prat used a Savart interferometer with spar components, the resulting interferential spectrometer being very costly and besides not corresponding to the objects of the present invention.

It is thus another object of the present invention to provide an interferential spectrometer which is simpler than the Sagnac, more compact and less expensive.

Further objects and advantages of the invention will emerge from the description which follows.

Applicants have found that one or more of the above-mentioned objects are achieved by using as a birefringent beam-splitter component one or several Wollaston prisms of a material suitable for the construction of such prisms and selected as a function of their birefringence and transparent over a wide range of wavelengths, for example quarts, spar, sodium nitrate, mercuric chloride or ethers.

The device according to the invention is characterised in that the beam-splitter is constituted by at least one Wollaston prism, or a modified Wollaston prism, located along the axis of the system.

According to another feature, the beam-splitter is constituted by two Wollaston prisms of different thicknesses and separated by a distance d along the axis, with their respective contact planes inclined opposite one another to the axis of the system, and their axes being such that the axis of the output prism of the first Wollaston is perpendicular to the axis of the input prism of the second Wollaston.

Another feature of the device is that the beam-splitter is formed from two identical Wollaston prisms arranged so that the output prism of the first Wollaston and the input prisms of the second Wollaston are parallel and that their diagonal contact planes are parallel, and that means are provided to make the beam-splitting vary by the translation of one of the prisms along the axis of the system, thus permitting the operating wavelength of the apparatus to be varied. It is observed that, one or more Wollaston prisms being obviously between a polarizer and an analyzer:

With one Wollaston prism, localised rectilinear fringes are obtained, as is already known, in an internal plane of the Wollaston prism and inclined at a certain angle to the axis of the system; according to the invention, it is possible to reform to the image of these fringes on a grating by means of a variable focus objective. This assembly has however two drawbacks: on the one hand, the inclination of the plane of localization; on the other hand, the fact that these fringes are at a finite distance require at the angle $\phi$ under which the source is seen, to remain less than $(1/\sqrt{R})$;

With two Wollaston prisms of different thicknesses, or a modified Wollaston prism, it is possible to make the plane of localization real and perpendicular to the optical axis of the system. In this assembly the angle $\phi$ is still limited to $(1/\sqrt{R})$. However, for low resolutions and for problems of correlation of spectra or correlation of derivatives of spectra, these two prisms enable the objective of the device according to the invention to be eliminated, With two Wollaston prisms of the same size, a system of fringes at infinity is obtained (hence high luminosity); the variable beam-splitting is possible by longitudinal translation of one of the prisms. The two Wollaston prisms thus associated in a device according to the aforementioned patent enable the price and bulk of the apparatus to be very substantially reduced and it is thus made much more compact. The device concerned gives on the one hand a splitting $$T = 2 \Delta n \left( \frac{e}{n_o} + d \right)$$

where $\Delta n$ is the value of the birefringence of the constituent of the prisms and $n_o$ its ordinary refractive index (on the hypothesis of a prism angle equal to 45°) and, on the other hand a perfectly equal division of the fluxes on the two interfering beam, and this (in the case of quartz) over a very extended range of wavelengths, from $0.2\mu$ to about $4\mu$. For quartz (birefringence $= 10^{-2}$, $n_o = 1.54$), for $e = 40$ mm and $d = 40$ mm, $T = 1.32$ mm, one has a field angle of $10^{-1}$ radian, a resolution $$R = \frac{2 \alpha T}{\lambda} = 530, (\lambda = 0.5\mu).$$

For low resolutions therefore, the Sagnac interferometer utilised in the aforementioned patent can advantageously be replaced by the dual Wollaston device, the remainder of the assembly remaining identical. The modulation is obtained by rotating the analyzer or the polarizer at substantially constant speed. This rotation results in forming alternately on the fixed grating, a system of fringes when the analyzer A and the polarizer P are parallel, or are complementary, when A and P are perpendicular; a particularly simple assembly of the whole is thus achieved.

U.S. Pat. No. 3,924,952 also relates to the study of rapid phenomena, for which it provides the formation of interference phenomena on two complementary gratings followed by two photomultipliers, of which the difference in currents was established. The present invention enables the same study of rapid phenomena, by forming on the same grating followed by a single photomultiplier, alternately two systems of complementary fringes at a very high frequency which can far exceed the megahertz. To this end, it is possible to mount between the polarizer (first prism) and the analyzer (second prism), a Pockels cell. Additional investigations have shown that in many cases, especially in the visible and ultraviolet, when it relates to gas absorption, the interferogram includes a central portion with some ten fringes and a portion centered in the vicinity of a difference of operation characteristic of the gas including also some ten fringes.

This has led to envisaging an optical correlator comprising a beam-splitting interferometer of a luminance permitting the high luminosity of the spectrometer of the aforesaid patent to be preserved, but only providing some fringes in the vicinity of the diference of operation characteristic of the substance studied.

BRIEF DESCRIPTION OF THE DRAWINGS

Several embodiments of the invention are described below with reference to the accompanying drawings, in which the various embodiments are shown diagrammatically, and in which.

DESCRIPTION OF PREFERRED EMBODIMENTS

Figure 1:
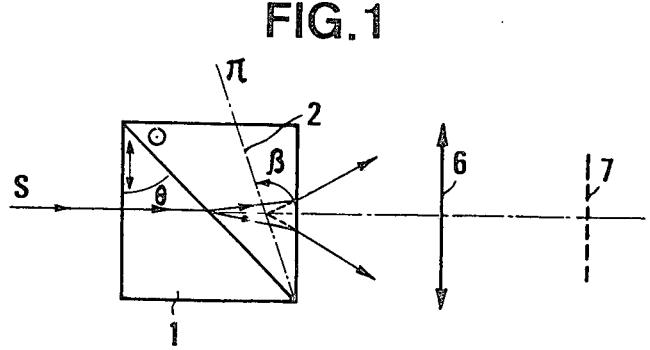
FIG. 1 shows the effect of a single Wollaston prism.

In FIG. 1, the Wollaston prism 1 of angle $\theta$ illuminated by the beam S, supplies rectilinear fringes 2 localised in the plane $\pi$ inclined by the angle $\beta$ to the optical axis of the beam S. An optical system with variable focus 6 forms the image of the fringes 2 on the grating 7 of the device.

Figure 2:
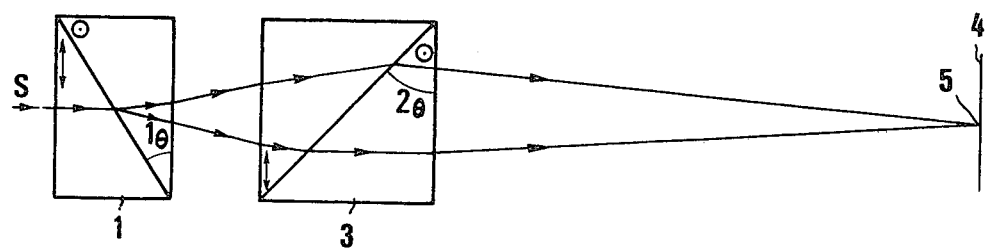
FIG. 2 shows one embodiment of the beam-splitter according to the invention with two different Wollaston prisms.

In FIG. 2, two Wollaston prisms 1 and 3 of different sizes receive the beam S, the plane of localisation 4 of the fringes 5 is rendered perpendicular to the optical axis of the system and the fringes can be received directly on the photoreceivers (not shown), by elimination of the objective of the aforementioned patent.

Figure 3:
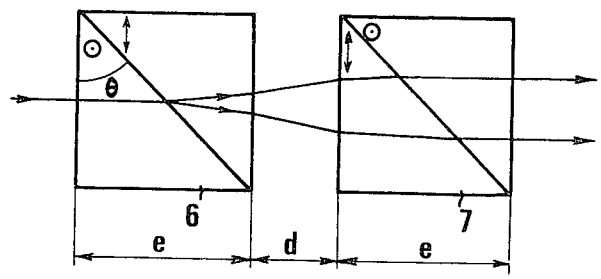
FIG. 3 shows a beam-splitter according to the invention, with two Wollaston prisms of the same size.

The two prisms 6 and 7 of FIG. 3 send the fringes on to the fixed grating (not shown), and the operations are carried out as in aforementioned patent.

Figure 4:
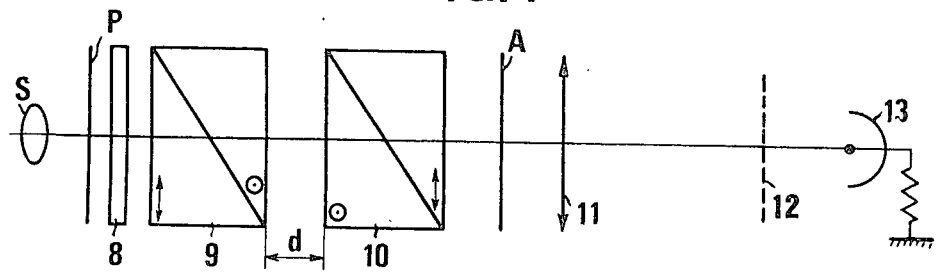
FIG. 4 shows a system according to the invention for the study of rapid phenomena.

In FIG. 4, there is to be seen the source S, the polarizer P, the Pockels cell 8, the first Wollaston prism 9, the second prism 10, the analyzer A, the objective 11, the single grating 12 and the single photoreceiver 13. In this device, the variable birefringence of the Pockels cell enables the direction of the polarizer to be switched over.

Hence it is seen that the device of the invention certainly enables fringes localised preferably at infinity to be provided as desired in the case of large resolutions, or at a finite distance for smaller resolutions.

Figure 5:
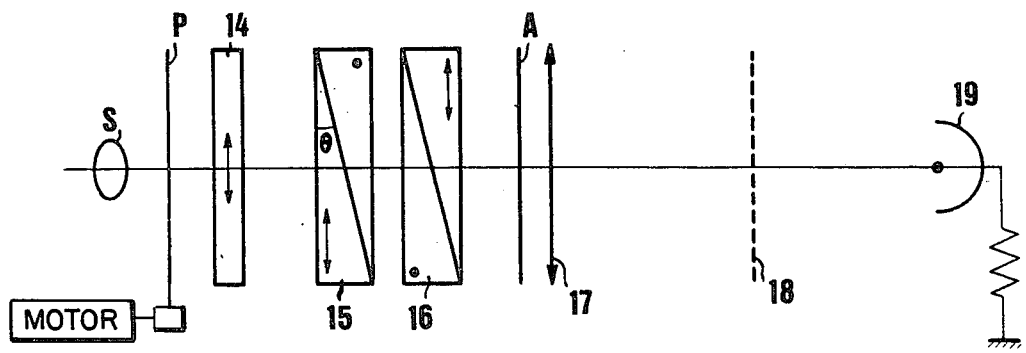
FIG. 5 shows an embodiment of the invention in which only some fringes in the vicinity of the difference of operation characteristic of the substance concerned, are preserved.

In FIG. 5, there is to be seen the source S, the polarizer P, a birefringent plate 14, two identical Wollaston prisms 15, 16 whose angle $\theta$ is calculated so as to obtain the number of fringes necessary, an analyzer A, an objective 17, a fixed grating 18 and a single photomultiplier 19.

The technique described above can be applied to the analysis by correlation of any substances having periodic absorption bands. It can hence be extended into the infra-red to exploit the vibration-rotation bands of molecules.

It will be apparent that various modifications are possible in the embodiments described above without departing from the scope of the invention as defined by the appended claims.

We claim:

1. A high luminosity device having a light source for interferential spectrometry, which comprises in order from the light source: a polarizer, a birefringent plate, a birefringent beam splitter, an analyzer, an objective lens to bring the beams into interference, a fixed grating located at the focal plane of the objective lens, photoelectric receiver means, and means for causing relative rotation between the polarizer and the analyzer so as to form alternately on the fixed grating a given system of fringes and its complement representing the Fourier transform of the spectral distribution of the source when the polarizer and the analyzer are parallel and perpendicular respectively, said beam splitter comprising two Wollaston prisms mounted along the optical axis, said prisms being made of materials selected as a function of their birefringence and transparent over a wide range of wavelengths.

2. A high luminosity device as defined in claim 1 wherein said Wollaston prisms are identical and are oriented relative to each other such that the axis of the output prism of the first Wollaston prism and the axis of the input prism of the second Wollaston are parallel and the diagonal contact planes of the two Wollaston prisms are parallel.

3. A high luminosity device having a light source for interferential spectrometry, which comprises in order from the light source: a polarizer, a Pockels cell, a birefrigent beam splitter, analyzer, an objective lens to bring the beams into interference, a fixed grating located at the focal plane of the objective lens, and photoelectric receiver means, the Pockels cell being effective to form alternately on the fixed grating a given system of fringes and its complement representing the Fourier transform of the source, said beam splitter comprising two Wollaston prisms mounted along the optical axis of the device and producing angular splitting, said prisms being made of materials selected as a function of their birefringence and transparent over a wide range of wavelengths.

4. A high luminosity device as defined in claim 3 wherein said Wollaston prisms are identical and are oriented relative to each other such that the axis of the output prism of the first Wollaston prism and the axis of the input prism of the second Wollaston are parallel and the diagonal contact planes of the two Wollaston prisms are parallel.

* * * * *